(12) United States Patent
Klinghult

(10) Patent No.: US 8,304,964 B2
(45) Date of Patent: Nov. 6, 2012

(54) MOBILE DEVICE AND POWER SUPPLY DEVICE WITH CONVERTER FOR CONVERTING ENERGY OF MECHANICAL MOVEMENT INTO ELECTRICAL ENERGY

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 13/367,890

(22) Filed: Feb. 7, 2012

(65) Prior Publication Data

US 2012/0146584 A1    Jun. 14, 2012

Related U.S. Application Data

(62) Division of application No. 12/496,756, filed on Jul. 2, 2009, now Pat. No. 8,125,122.

(51) Int. Cl.
*H01L 41/113* (2006.01)

(52) U.S. Cl. .......................................................... 310/339
(58) Field of Classification Search .................... 310/339
See application file for complete search history.

(56) References Cited

U.S. PATENT DOCUMENTS 7,804,223 B1    9/2010    Teowee
2007/0257634 A1    11/2007    Leschin et al.

*Primary Examiner* — Derek Rosenau
(74) *Attorney, Agent, or Firm* — Peter F. Corless; Steven M. Jensen; Edwards Wildman Palmer LLP

(57) ABSTRACT

A mobile device and a power supply device are provided in which a first part of a connector detachably connects an electrical device to the mobile device, a second part of the connector matches the first part, and a converter generates electrical energy by converting energy of a mechanical movement into electrical energy, where the electrical energy is generated by relative mechanical movement occurring between first and second parts of the connector when the first and second parts are connected.

7 Claims, 3 Drawing Sheets

MOBILE DEVICE AND POWER SUPPLY DEVICE WITH CONVERTER FOR CONVERTING ENERGY OF MECHANICAL MOVEMENT INTO ELECTRICAL ENERGY

CROSS-REFERENCE TO RELATED APPLICATION(S)

This application is a divisional of copending application U.S. Ser. No. 12/496,756 filed on Jul. 2, 2009.

BACKGROUND OF THE INVENTION

The present invention relates to a method and a circuit for energizing an electrical device, as well as a system, a mobile device, and a power supply device using the method and the circuit for energizing an electrical device.

BRIEF SUMMARY OF THE INVENTION

According to an embodiment of the present invention, a method for energizing an electrical device is provided. The electrical device is coupled via a switch to an electrical power supply. According to the method, electrical energy is generated by converting energy of a mechanical movement into electrical energy. The generated electrical energy is supplied to the switch to provide an electrical coupling of the electrical device to the electrical power supply. The switch may be a semiconductor switch, for example a thyristor, a MOSFET, an IGBT or the like, or a mechanical switch, for example a relais. The electrical device may be a charger for charging a further electrical device, for example a battery powered mobile device. The charger and the battery powered device may be detachably connectable with each other via a plug and a matching socket. In this case, the electrical energy for activating the switch may be generated by the mechanical movement of inserting the plug into the socket. Furthermore, the electrical device may be a power supply unit for supplying the further device with electrical energy from the electrical power supply.

In the field of consumer electronics, especially battery powered mobile devices like for example mobile phones, mobile personal digital assistants, mobile audio playback devices like MP3 players, and mobile computers, the mobile device is coupled to the electrical power supply via a charger or a power supply unit. The charger or the power supply unit is on one side detachably connected to the battery powered mobile device via a connector comprising a plug and a matching socket, and on the other side via another connector to the electrical power supply, the so-called mains. Many users of such consumer electronics leave the charger or power supply unit connected to the electrical power supply, when they disconnect the mobile battery powered device from the charger or power supply unit. However, even when the connection between the mobile or battery powered device to the charger or power supply unit is disconnected, the charger or the power supply unit still consume electrical energy from the electrical power supply as long as it is are electrically connected to the electrical power supply.

Therefore, according to an embodiment of the present invention, the charger or the power supply unit is coupled to the electrical power supply via a switch which is adapted to couple and decouple the charger or the power supply unit electrically to/from the electrical power supply. A decoupling may be initiated by sensing a disconnecting of the mobile battery powered device from the charger or the power supply unit. For initiating an initial coupling of the charger or the power supply unit to the electrical power supply, the switch has to be activated, thus energizing the charger or the power supply unit with electrical energy from the electrical power supply. Therefore, according to an embodiment of the present invention, electrical energy is generated by converting a mechanical movement into electrical energy, and this electrical energy is provided to the switch. After the charger or the power supply unit has been energized, the switch may then be held in the activated state with electrical energy being derived from the charger or the power supply unit from the electrical power supply. Thus, the charger or the power supply unit consumes electrical energy only when the mobile battery powered device is connected.

According to an embodiment of the present invention, a piezoelectric element is used for generating electric energy from a mechanical movement by using the piezoelectric effect. Possible materials for the piezoelectric element include piezoelectric plastics and piezoelectric ceramics, for example. Therefore, the piezoelectric element may be integrated into a connector connecting the electrical device like the charger or the power supply unit to the further electrical device like the mobile battery powered device. Thus, when connecting the electrical device with the further device by moving the plug into the matching socket, the piezoelectric element may be mechanically activated to generate the electrical energy being supplied to the switch.

According to another embodiment, the generated electrical energy is galvanically isolated from the switch. This helps to separate lower voltages on a secondary side of the electrical device from higher voltages of a primary side of electrical device, to keep hazardous voltages away from the user.

According to another embodiment, the generated electrical energy is stored before being supplied to the switch. When using for example a piezoelectric element for generating the electrical energy, the piezoelectric element may generate a short peak of high energetic electrical energy. This peak may be too short for energizing the electrical device long enough to get the electrical device started up, and therefore it may be advantageous to store this electrical energy for example in a capacitor intermediately and provide it for a longer time from the capacitor to the switch until the electrical device is started up. Furthermore, the generated electrical energy may be limited to a predefined range, to avoid voltage peaks which may be dangerous for the electrical device, the further electrical device or user.

According to another embodiment of the present invention a circuit for energizing an electrical device is provided. The circuit comprises a switch, a converter, and a control circuit. The switch is adapted to couple the electrical device to an electrical power supply. The converter is adapted to generate electrical energy by converting energy of a mechanical movement into electrical energy. The control circuit is coupled to the switch and the converter and is furthermore adapted to supply the generated electrical energy from the converter to the switch, wherein the switch upon receiving the generated electrical energy provides an electrical coupling of the electrical device to the electrical power supply. The converter for generating electrical energy from a mechanical movement may be a piezoelectric element utilizing the piezoelectric effect for generating the electrical energy from the mechanical movement. The electrical device may comprise a charger for charging a further device or a power supply unit for supplying the further device with electrical energy from the electrical power supply. The electrical device may be detachably connectable to the further device via a connector comprising a plug and a matching socket. The converter, for example the piezoelectric element, may be integrated into the connector such that the generated electrical energy is generated by the mechanical movement when the plug is inserted into the socket.

The further device may comprise a battery powered device which cannot be connected directly to the high voltage of the electrical power supply, but needs to be supplied by a lower voltage derived from the electrical power supply by the electrical device, for example the charger or the power supply unit. The battery powered device may be a mobile device, a mobile phone, a personal digital assistant, a mobile navigation system or a mobile computer.

According to another embodiment the control circuit is further connected to the electrical device and configured to supply electrical energy from the electrical device to the switch after the mechanically generated electrical energy was supplied to the switch. Thus, the electrical coupling of the electrical device to the electrical power supply is maintained even when after the mechanical movement the converter does not provide further electrical energy to the switch.

According to another embodiment, the control circuit comprises a transformer for galvanically isolating the electrical energy generated by the converter from the switch. Furthermore, the control circuit may comprise a capacitor for storing the generated electrical energy before it is supplied to the switch. Finally, the control circuit may comprise a voltage limiting arrangement like a Zener diode, a breakdown diode, a low pass filter or a voltage regulator etc. for limiting the voltage of the electrical energy generated by the converter to a predefined range.

According to another embodiment of the present invention a system comprising a first electrical device, a second electrical device, a switch, a connector, a converter and a control circuit is provided. The first electrical device, for example a charger or a power supply unit, is configured to adapt electrical energy from an electrical power supply, a so-called mains, to electrical requirements of the second electrical device, for example a mobile device, a battery powered device, a mobile phone, a personal digital assistant, a mobile navigation system or a mobile computer. The switch is adapted to couple the first electrical device to the electrical power supply and may comprise a thyristor, a MOSFET or an IGBT. The connector is adapted to detachably connect the first electrical device to the second electrical device. The connector comprises a plug and a matching socket. According to a preferred embodiment, the connector is a USB connector. The converter is adapted to generate electrical energy by converting a mechanical movement into electrical energy. The converter is integrated into the connector such that the generated electrical energy is generated by a mechanical movement of the plug being inserted into the socket. The control circuit is coupled to the switch and the converter. The control circuit is adapted to supply the generated electrical energy from the converter to the switch to enable the switch to provide an electrical coupling of the first electrical device to the electrical power supply.

The system may further comprise an energy supply line for supplying energy from the first electrical device to the second electrical device. The energy supply line may be a multiple-conductor line or cable which is on one end of the line fixedly connected to the first electrical device and provides for example a plug on the other end, wherein the plug is matching to a socket provided in the second electrical device. The generated electrical energy, which may be generated by moving the plug into the socket, is transmitted from the converter to the control circuit via the energy supply line.

According to another embodiment of the present invention a mobile device is provided which comprises a first part of a connector for detachably connecting an electrical device, for example a charger or a power supply unit, to the mobile device. The electrical device comprises a second part of the connector which is matching to the first part comprised in the mobile device. The mobile device comprises furthermore a converter adapted to generate electrical energy by converting energy of a mechanical movement into electrical energy. The converter is integrated into the first part of the connector such that the generated electrical energy is generated by the mechanical movement which occurs when the first part of the connector is connected to the second part of the connector, for example when the first part is inserted into the second part or vice versa.

The mobile device may be a battery powered device, for example a mobile phone, a personal digital assistant, a mobile navigation system or a mobile computer.

According to yet another embodiment of the present invention, a power supply device is provided. The power supply device comprises a power converter, a switch, a first part of a connector, a converter, and a control circuit coupled to the switch and the converter. The power converter is adapted to convert electrical energy from an electrical power supply, a so-called mains, to electrical requirements of a further electrical device which is connectable to the first part of the connector. In general, this conversion comprises a conversion of electrical energy with a high voltage, for example 110 V or 220 V, to electrical energy with a lower voltage, typically in the range of 5-25 V. However, a power converter is not restricted to such a downscaling of the voltage and may also provide an upscaling of the voltage, for example to convert 12 V from an electrical power supply of a vehicle to the electrical requirements of the further electrical device. The switch is adapted to couple the power converter to the electrical power supply and may comprise a semiconductor switch, for example a thyristor, a triac, a MOSFET, or an IGBT. The first part of the connector may be a plug or a socket for detachably connecting the power supplied device to the further electrical device, wherein the further electrical device comprises a second part of the connector, for example a socket or a plug matching to the first part. The converter is adapted to generate electrical energy by converting energy of a mechanical movement into electrical energy. The converter is integrated into the connector such that the generated electrical energy is generated by the mechanical movement when the first part of the connector and the second part of the connector are connected. The control circuit as adapted to supply the electrical energy generated from the converter to the switch to provide an electrical coupling of the power converter to the electrical power supply.

The power supply device may be a charger for charging the further electrical device. The converter for generating the generated electrical energy from the mechanical movement may be integrated in the first part of the connector or may be alternatively integrated in the second part of the connector.

Although specific features described in the above summary and the following detailed description are described in connection with specific embodiments, it is to be understood that the features of the embodiments described can be combined with each other, unless it is noted otherwise.

BRIEF DESCRIPTION OF THE DRAWINGS

Hereinafter exemplary embodiments of the invention will be described with reference to the drawings.

DETAILED DESCRIPTION OF THE INVENTION

Figure 1:
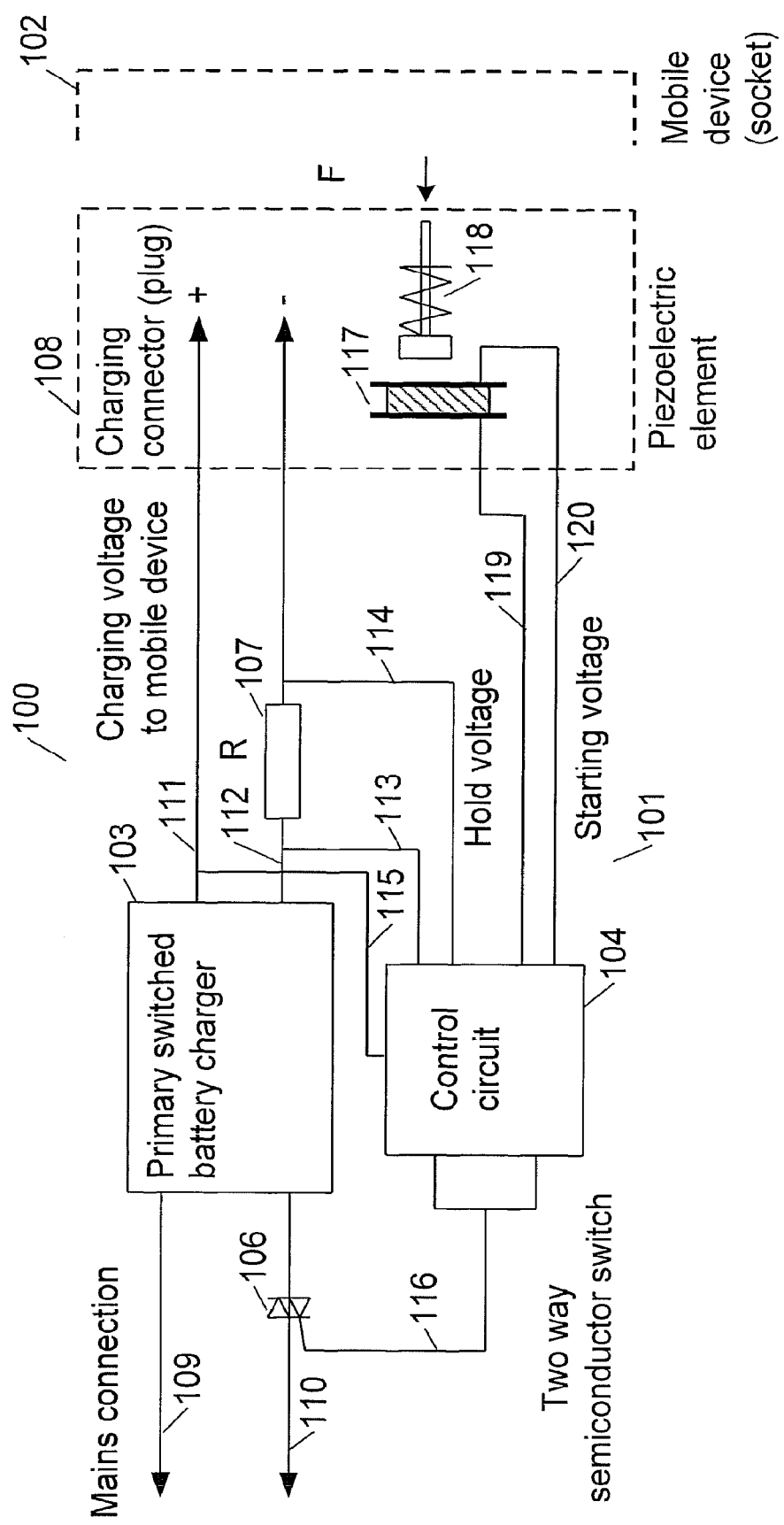
FIG. 1 shows a block diagram of a system according to an embodiment of the present invention.

In the following, exemplary embodiments of the present invention will be described in detail. It is to be understood that the following description is given only for the purpose of illustrating the principles of the invention and it is not to be taken in a limiting sense. Rather, the scope of the invention is defined only by the appended claims and is not intended to be limited by the exemplary embodiments hereinafter.

It is to be understood that in the following detailed description of the exemplary embodiments, any direct connection or coupling between functional blocks, devices, components or other physical or functional units shown in the drawings or description herein could also be implemented by an indirect connection or coupling. The use of same reference numbers in different instances in the description and the figures may indicate similar or identical items.

It is further to be understood that the features of the various exemplary embodiments described herein may be combined with each other unless specifically noted otherwise.

FIG. 1 shows an embodiment of a system 100 according to the present invention. The system 100 comprises a charger 101 and a mobile device 102, for example a mobile phone. The charger 101 comprises a primary switched battery charger 103, a control circuit 104, a two-way semiconductor switch 106, a current sensing resistor 107 and a charging connector 108. The primary switched battery charger 103 is connectable via lines 109 and 110 to an electrical power supply, a so-called mains, providing for example 110V or 220 V.

In the line 110 the semiconductor switch 106 is inserted such that, when the switch 106 is in the disconnected state, the primary switched battery charger 103 is electrically completely disconnected from the electrical power supply and no current is flowing through lines 109 and 110. When the semiconductor switch 106 is in the connected state, the primary switched battery charger 103 is connected to and supplied with energy from the electrical power supply via lines 109 and 110.

The primary switched battery charger 103 is adapted to convert a high voltage supplied from the electrical power supply into a low voltage which is suitable for charging a battery of the mobile device 102. When the primary switched battery charger 103 is connected on its primary side via lines 109 and 110 to the electrical power supply, the primary switched battery charger 103 provides on its secondary side via lines 111 and 112 the lower voltage. The lines 111 and 112 connect the secondary side of the primary switched battery charger 103 with the charging connector 108. The charging connector 108 may be a plug which fits into a corresponding socket in the mobile device 102.

As shown in FIG. 1, in line 112 a series resistor R 107 is inserted which is used as a current sensing resistor which provides a current sensing voltage on lines 113 and 114 as long as a current is flowing through line 112 and the resistor 107. Therefore, when the mobile device 102 is connected via the charging connector 108 to the primary switched battery charger 103, and the primary switched battery charger 103 is connected via lines 109 and 110 to the electrical power supply, a charging voltage will be present on lines 111 and 112 and a corresponding charging current will flow through lines 111 and 112 causing a hold voltage on lines 113 and 114.

The charging voltage on lines 111 and 112 is additionally supplied via lines 115 and 113, respectively, to the control circuit 104, and additionally the hold voltage on lines 113 and 114 is supplied to the control circuit 104. As long as the charging voltage and the hold voltage are present, the control circuit 104 activates the semiconductor switch 106 via a connection 116 between the control circuit 104 and the semiconductor switch 106 to keep the semiconductor switch 106 in the connected state. When the charging connector 108 is removed from the mobile device 102, i.e. the plug of the charging detector 108 is pulled out of the socket of the mobile device 102, the current flow through the lines 111 and 112 is stopped. Thus, the hold voltage on the lines 113 and 114 becomes zero and the control circuit 104 causes the semiconductor switch 106 via the connection 116 to change into the disconnected state. Because of this there is no current flow through the lines 109 and 110 from the electrical power supply to the battery charger 103 and thus the battery charger 103 does not consume any energy from the electrical power supply anymore.

However, when the charging connector 108 is reconnected to the mobile device 102, the charger 101 has to be reenergized to provide the charging voltage for the mobile device 102. This is accomplished by generating electrical energy by converting mechanical energy into electrical energy. The mechanical energy is induced by the insertion of the charging connector 108 into the socket of the mobile device 102, as indicated by a force arrow F in FIG. 1. To accomplish this, the charging connector 108 comprises a piezoelectric element 117 and a spring suspended hammer 118. The piezoelectric element 117 is for example a piezoelectric ceramic or a piezoelectric plastic. The piezoelectric element 117 works in a similar way as a piezoelectric gas lighter, but using much lower force and much lower voltage. The spring suspended hammer 118 is released when the charging connector 108 is plugged into the mobile device 102. The hammer 118 hits the piezoelectric element 117 thus generating a transient voltage as a starting voltage on lines 119 and 120. When the charging connector plug 108 is unplugged from the mobile device socket 102, the spring of the spring suspended hammer 118 is returned to its initial state.

Thus, the piezoelectric element 117 is excited by an impact from the spring suspended hammer mechanism 118, and the transient starting voltage is provided to the control circuit 104. This starting voltage is fed from the control circuit 104 via the connection 116 to the semiconductor switch 106. The energy needed to trigger the semiconductor switch 106 is low and the energy provided by the piezoelectric element 117 is sufficient to energize the semiconductor switch 106 for such a long time that the primary switched battery charger 103 gets started up and provides the charging voltage to the mobile device 102 and thus the hold voltage on lines 113 and 114 for keeping the switch 106 via the control circuit 104 in the conducting state even when there is no more energy from the piezoelectric element 117.

Figure 2:
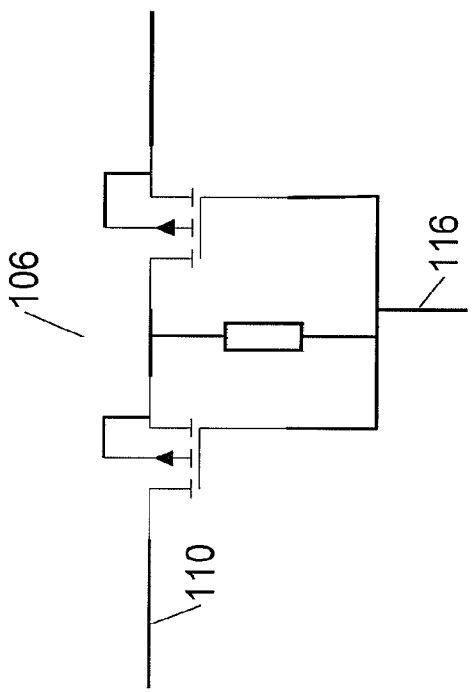
FIG. 2 shows an embodiment of a switch according to an embodiment of the present invention in more detail.

The two way semiconductor switch 106 may be composed of a triac as indicated in FIG. 1 or may be composed of two MOSFETs in series as indicated in FIG. 2, or may be composed of IGBTs in series (not shown) or of any other suitable kind of semiconductor switch.

Figure 3:
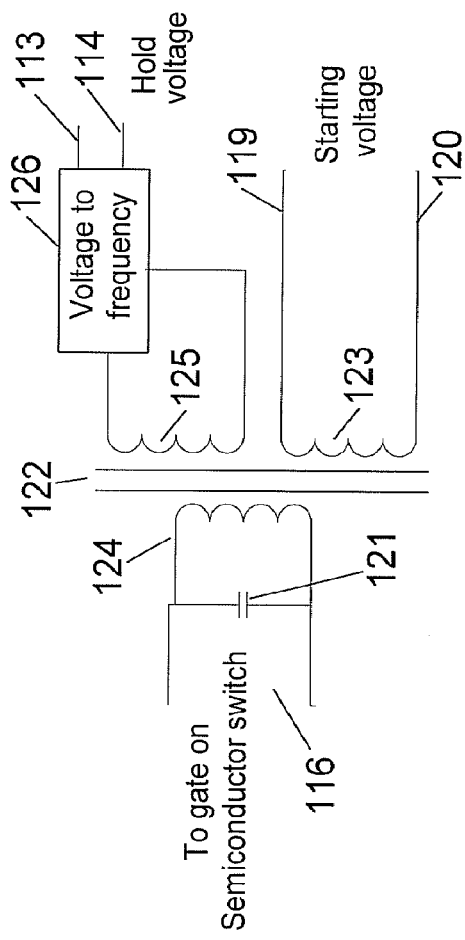
FIG. 3 shows an embodiment of a control circuit according to an embodiment of the present invention.

If there is a demand of a galvanic isolation, a transformer 122 can be used for coupling the transient voltage from the piezoelectric element 117, as indicated in FIG. 3. The transient voltage or starting voltage from the piezoelectric element 117 (FIG. 1) is supplied to a first winding 123 of the transformer 122. This starting voltage induces in a second winding 124 of the transformer 122 a voltage which is intermediately stored in a capacitor 121 and provided via the connection 116 to a gate or control input of the semiconductor switch 106. The capacitor 121 is optional. The capacitor 121 increases the time the starting voltage is supplied to the semiconductor switch 106 when the lengths of the transient voltage of the starting voltage is too short to start up the primary switched battery charger 103. As indicated in FIG. 3, also the hold voltage on lines 113 and 114 can be galvanically isolated from the primary side of the primary switched battery charger 103. The hold voltage provided on lines 113 and 114 is converted by a voltage to frequency converter 126 into an alternating current (AC). This alternating current is supplied to a third winding 125 of the transformer 122 and induces a hold voltage in the second winding 124 of the transformer 122. This hold voltage is provided to the semiconductor switch 106 via the connection 116 as indicated in FIG. 1.

Figure 4:
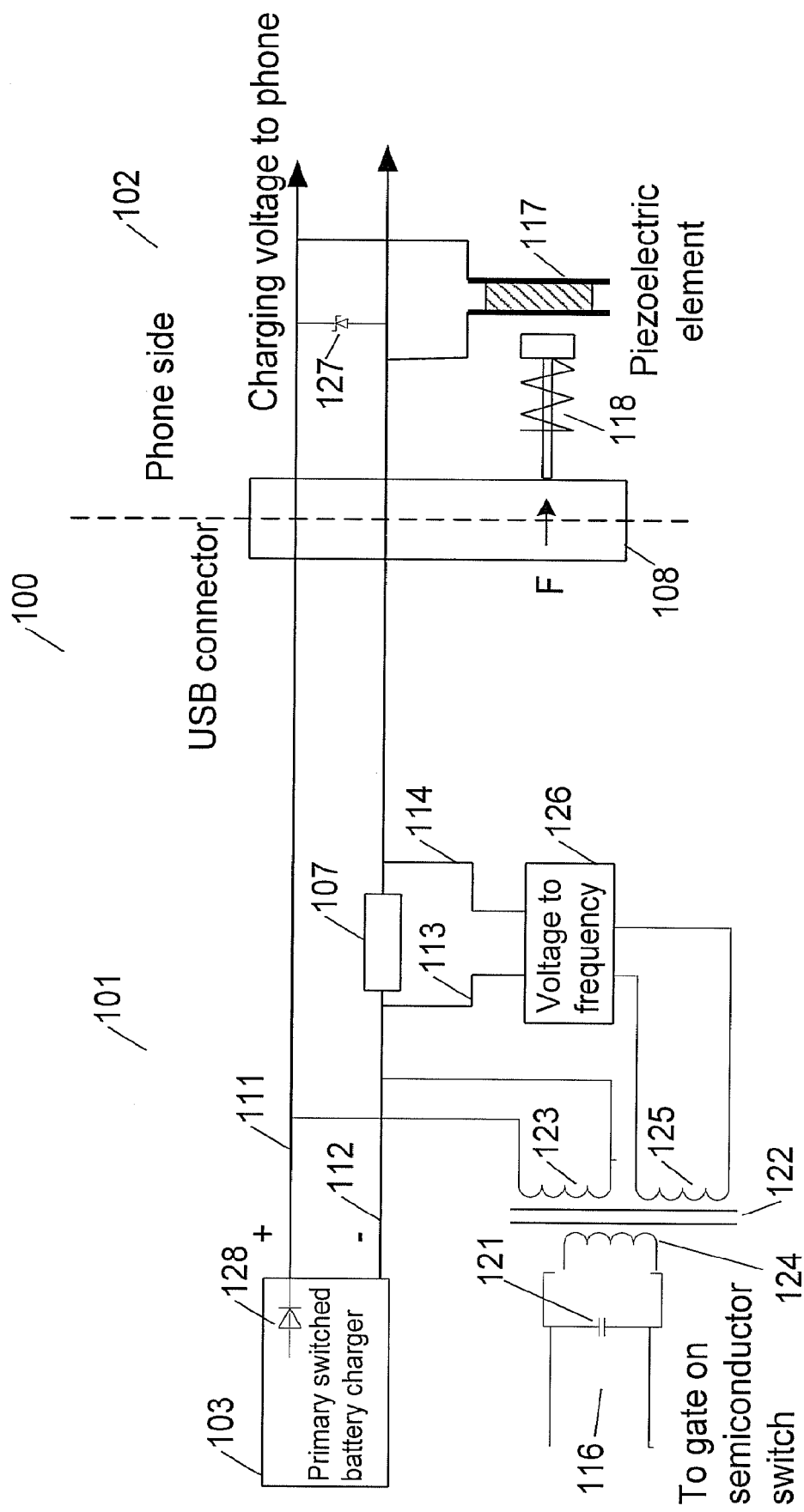
FIG. 4 shows another embodiment of a system according to an embodiment of the present invention.

FIG. 4 shows another embodiment of a system 100 comprising a charger 101 and a mobile phone 102. Similar reference signs in FIGS. 1 and 4 indicate similar components and a detailed description of the components already described in connection with FIG. 1 is therefore omitted.

The connection between the charger and the mobile phone 102 in FIG. 4 is accomplished by a so-called USB connector 108, and, as this USB connector 108 is a standardized component, in this embodiment the piezoelectric element 117 and the spring suspended hammer mechanism 118 are not integrated into the USB connector 108, but integrated into the mobile phone 102. As the standardized USB connector does not provide additional ports and lines for transmitting the starting voltage, for example lines 119 and 120 of FIG. 1, the transient voltage from the piezoelectric element 117 is overlaid on voltage lines 111 and 112 which are used for charging the battery of the mobile phone 102. As indicated in FIG. 4, the feeding point from the piezoelectric element 117 can be equipped with a transient protection like a Zener diode 127 or a low pass filter (not shown) making sure that a too high voltage is not output on the lines 111 and 112.

As stated above, the piezoelectric element 117 and the spring suspended hammer mechanism 118 are integrated into the mobile phone 102. The spring suspended hammer is released when the USB connector 108 is inserted into the mobile phone 102 providing a force F on the hammer. The hammer hits the piezoelectric element 117 and causes the piezoelectric element 117 to generate a transient voltage which is supplied via the lines 111 and 112 to the first winding 123 of the transformer 122. The transient voltage from the piezoelectric element 117 induces in the second winding 124 of the transformer 122 a starting voltage which is supplied via the connection 116 to the semiconductor switch 106, as indicated in FIG. 1. When the connector 108 is unplugged from the mobile phone 102 the spring of the spring suspended hammer mechanism 118 is returned to its initial state. As the piezoelectric material of the piezoelectric element 117 is purely capacitive (e.g. in the range of 100 pF to 1 nF) this will not affect the normal voltage provided on lines 111 and 112 for charging the battery of the mobile phone 102. To protect the primary switched battery charger 103 from the transient voltage of the piezoelectric element 117 a diode 128 may be coupled in series to line 111.

To sum up, when the piezoelectric element 117 is excited by an impact F from the mechanism 118, a voltage transient is generated as a starting voltage. This starting voltage is fed to the semiconductor switch 106. Therefore, no extra voltage for triggering the semiconductor switch 106 is needed. Once the switch 106 is triggered, the switch 106 will conduct and the primary switched charger 103 will start and supply voltage to the mobile device or mobile phone 102. As long as current is flowing to the mobile device or mobile phone 102 the hold voltage will ensure that the semiconductor switch 106 will be in the conducting state. When the mobile device or mobile phone 102 is decoupled from the charger 101, the hold voltage will break down and the switch 106 will be in a nonconductive state. In this state no current or leak current exists and therefore the charger 101 does not consume any energy in this state.

While exemplary embodiments have been described above, various modifications may be implemented in other embodiments. For example, the semiconductor switch 106 may be supplied directly from the piezoelectric element 117, without using the transformer 122. Furthermore, for example, the hold voltage may be derived in a different manner from the primary switch battery charger 103.

Furthermore, the embodiments described above may not only be used in a mobile phone, but may be used in any other kind of mobile device or battery powered device being supplied by a separate battery charger or a separate power supply unit which is connected to the device via a connector. It is also understood that all the embodiments described above are considered to be comprised by the present invention as it is defined by the appended claims.

What is claimed is:

1. A mobile device comprising:
   a first part of a connector for detachably connecting an electrical device to the mobile device, the electrical device comprising a second part of the connector, the second part matching the first part, and
   a converter adapted to generate electrical energy by converting energy of a mechanical movement into electrical energy, the converter being integrated into the first part of the connector such that the generated electrical energy is generated by relative mechanical movement occurring between the first part and the second part when the first part and the second part are connected.

2. The mobile device according to claim 1, wherein the electrical device comprises a charger for charging the mobile device.

3. The mobile device according to claim 1, wherein the mobile device comprises a battery powered device selected from the group comprising a mobile device, mobile phone, a personal digital assistant, a mobile navigation system, and a mobile computer.

4. A power supply device, comprising:
   a power converter for adapting electrical energy from an electrical power supply to electrical requirements of an electrical device,
   a switch adapted to couple the power converter to the electrical power supply,
   a first part of a connector for detachably connecting the power supply device to the electrical device, the electrical device comprising a second part of the connector matching to the first part,
   a converter adapted to generate electrical energy by converting energy of a mechanical movement into electrical energy, the converter being integrated into the connector such that the generated electrical energy is generated by relative mechanical movement occurring between the first part and the second part when the first part and the second part are connected, and
   a control circuit coupled to the switch and the converter, wherein the control circuit is adapted to supply the generated electrical energy from the converter to the switch to provide an electrical coupling of the power converter to the electrical power supply.

5. The power supply device according to claim 4, wherein the power supply device comprises a charger for charging the electrical device.

6. The power supply device according to claim 4, wherein the converter is integrated in the first part of the connector.

7. The power supply device according to claim 4, wherein the converter is integrated in the second part of the connector.

* * * * *